United States Patent
Kung et al.

(10) Patent No.: US 8,169,208 B2
(45) Date of Patent: May 1, 2012

(54) OUTPUT CURRENT DETECTION OF A VOLTAGE REGULATOR

(75) Inventors: Nien-Hui Kung, Hsinchu (TW); Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 421 days.

(21) Appl. No.: 12/457,665

(22) Filed: Jun. 18, 2009

(65) Prior Publication Data

US 2009/0315527 A1    Dec. 24, 2009

(30) Foreign Application Priority Data

Jun. 20, 2008   (TW) ................................ 97123134 A

(51) Int. Cl.
*G05F 1/40* (2006.01)
*G05F 1/613* (2006.01)

(52) U.S. Cl. .................. 323/285; 323/225; 323/271

(58) Field of Classification Search .................. 323/222, 323/223, 225, 268, 271, 282, 285
See application file for complete search history.

(56) References Cited

U.S. PATENT DOCUMENTS

| | | | | |
|---|---|---|---|---|
| 7,714,556 | B2* | 5/2010 | Chu et al. ...................... | 323/282 |
| 2004/0169979 | A1* | 9/2004 | Pai ............................... | 361/93.1 |
| 2011/0089920 | A1* | 4/2011 | Leong et al. .................. | 323/283 |
| 2011/0267015 | A1* | 11/2011 | Lu et al. ....................... | 323/235 |

* cited by examiner

*Primary Examiner* — Matthew Nguyen
(74) *Attorney, Agent, or Firm* — Rosenberg, Klein & Lee

(57) ABSTRACT

For output current detection of a voltage regulator, the currents in a high-side transistor and a low-side transistor of the voltage regulator are sensed and summarized to a summed current to flow through a setting resistor. The voltage variation on the setting resistor is monitored to provide a feedback signal for feedback control in the voltage regulator. This detection scheme removes the current sensing resistor from the charging current path of the voltage regulator to prevent efficiency loss on it, and is much less sensitive to noise interference because greater voltage variation is available by using a greater setting resistor.

22 Claims, 6 Drawing Sheets

OUTPUT CURRENT DETECTION OF A VOLTAGE REGULATOR

FIELD OF THE INVENTION

The present invention is related generally to voltage regulators and, more particularly, to the output current detection of a voltage regulator.

BACKGROUND OF THE INVENTION

To provide a regulated output current as a charger from a buck-type converter, typically a current sensing resistor is connected to the inductor to detect the current flowing therethrough by monitoring the dropout voltage on the current sensing resistor. But this current sensing resistor will reduce the efficiency and may cause thermal issue. For example, FIG. 1 is a diagram showing a popular structure in switching chargers by using a current sensing resistor, as disclosed in U.S. Pat. No. 6,369,561, LTC 4001 and SMB 135, in which the output current Io of a voltage regulator flows through a current sensing resistor Rsense so that the voltage drop on the current sensing resistor Rsense is proportional to the output current Io and, more specifically, the current flowing through the current sensing resistor Rsense and the output current Io have a fixed 1:1 proportional relationship therebetween. The voltage drop on the current sensing resistor Rsense is injected into the differential inputs of an error amplifier 10 to provide a signal to a controller 12 for feedback control, thus controlling a driver 14 to switch power transistors.

In the conventional method for output current detection of a voltage regulator, the current sensing resistor Rsense is located in the charging current path and therefore, it must be a precision resistor and have a low resistance to reduce the power loss on it. However, a low resistance can produce only a small voltage variation and a small voltage variation is sensitive to and easily interfered by noise.

SUMMARY OF THE INVENTION

An object of the present invention is to provide an apparatus for output current detection of a voltage regulator.

Another object of the present invention is to provide a method for output current detection of a voltage regular.

A further object of the present invention is to provide a voltage regulator with function of output current detection.

According to the present invention, an output current detection of a voltage regulator includes sensing the currents in a high-side element and a low-side element of the voltage regulator to generate a first current and a second current, respectively, and combining the first and second currents to generate a summed current to flow through a setting resistor to produce a voltage drop thereacross to provide the information of the variation of the output current of the voltage regulator. This information of output current variation extracted from the setting resistor is provided for a controller of the voltage regulator for feedback control.

Alternatively, only one of the high-side and low-side elements is detected for the current therein, and the summed current is generated by simulation with the detected current.

The present invention proposes an apparatus and method for output current detection of a voltage regulator, which remove the current sensing resistor from the charging current path of the voltage regulator to prevent the efficiency loss on it, and enable precise detection of the variation at the output of the voltage regulator by using the setting resistor not in the charging current path for facilitating the feedback control of the voltage regulator.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
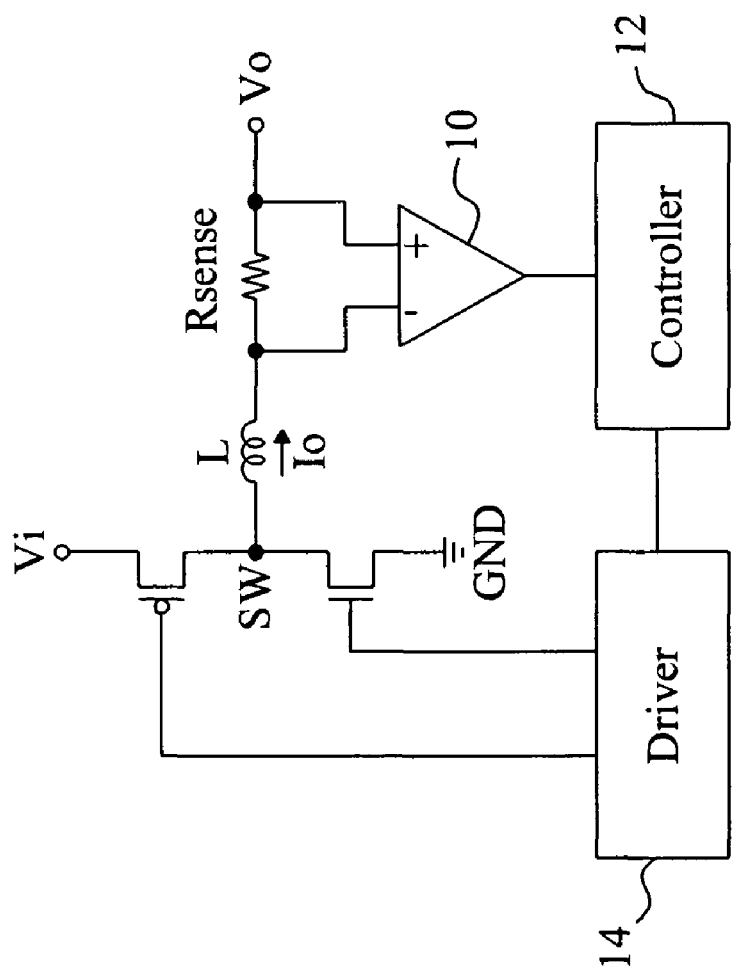
FIG. 1 is a schematic diagram of a conventional voltage regulator.
Figure 2:
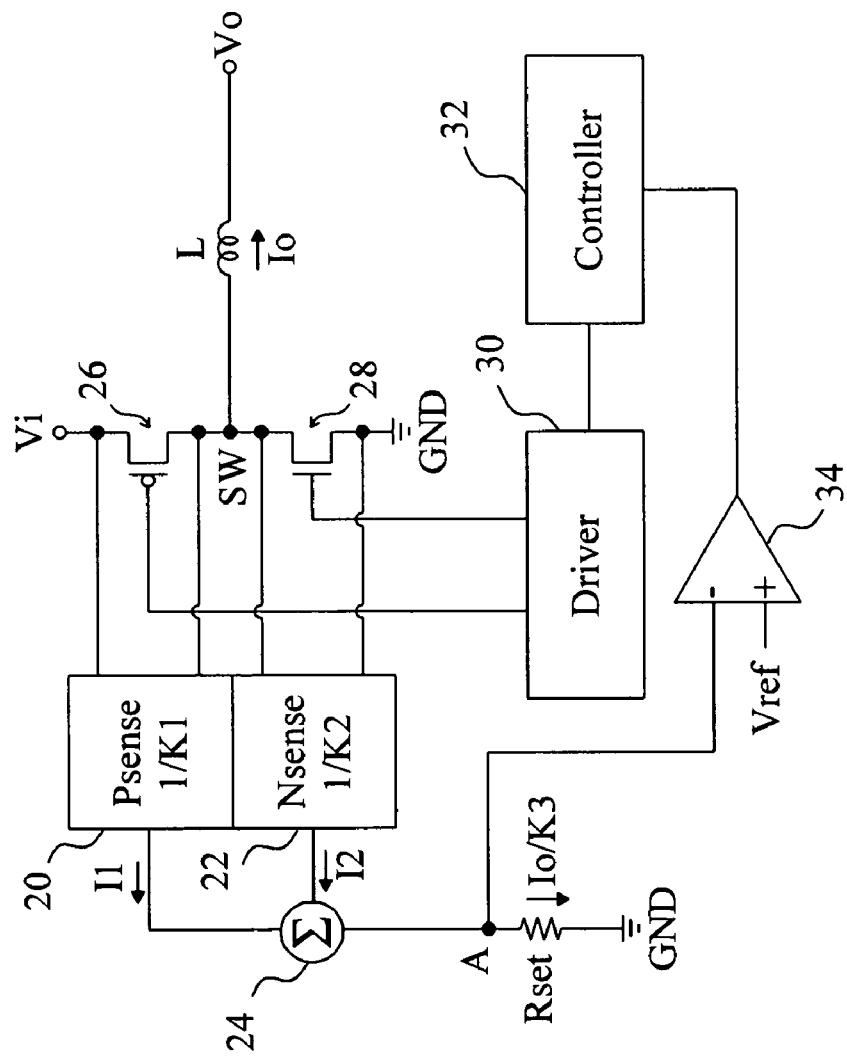
FIG. 2 is a schematic diagram of a first embodiment according to the present invention.

FIG. 2 provides a first embodiment according to the present invention for buck voltage regulators, in which a high-side transistor 26 is coupled between a power input Vi and a switching node SW, a low-side transistor 28 is coupled between the switching node SW and a ground terminal GND, an inductor L is coupled between the switching node SW and a power output Vo, a driver 30 switches the high-side transistor 26 and the low-side transistor 28 to control the output current Io flowing through the inductor L to generate an output voltage Vo, a high-side sensing circuit 20 senses the current in the high-side transistor 26 to generate a current I1 with K1 ratio, a low-side sensing circuit 22 senses the current in the low-side transistor 28 to generate a current I2 with K2 ratio, and the currents I1 and I2 are summarized by a summing circuit 24 to flow through a setting resistor Rset. The role of the setting resistor Rset is similar to the conventional current sensing resistor Rsense but will not cause huge efficiency loss by the K ratio of reducing current. In this embodiment, the relationships between each of the currents I1 and I2 and the output current Io are no longer fixed at 1:1, and the proportion between the currents I1 and I2 is adjustable, for example, by using different parameters K1 and K2 to produce the currents I1 and I2. The combination of the currents I1 and I2 can be denoted by Io/K3, and the parameters K1 and K2 can be adjusted as needed, for example, to eliminate the offset or delay. The voltage variation at the node A provides variation information of the output current Io, and is detected by a comparator 34 and compared with a reference voltage Vref to provide a feedback signal to a controller 32 for feedback control. Since the setting resistor Rset is not located in the charging current path of the voltage regulator, it may have a great resistance for the voltage variation at the node A to have significant values. Thus, a precision resistor can be dispensed with to lower cost, and the voltage variation caused by the great resistance of the setting resistor Rset is also less susceptible to noise interference.

A voltage regulator used as a charger typically has an over-current protection (OCP) mechanism or a zero-current detection mechanism for monitoring the currents in the power transistors to implement protection when the output current is excessively high or excessively low. These conventional detection mechanisms may be used in the present invention as the high-side sensing circuit 20 or the low-side sensing circuit 22, to monitor the variation of the output current Io for feedback control.

Figure 3:
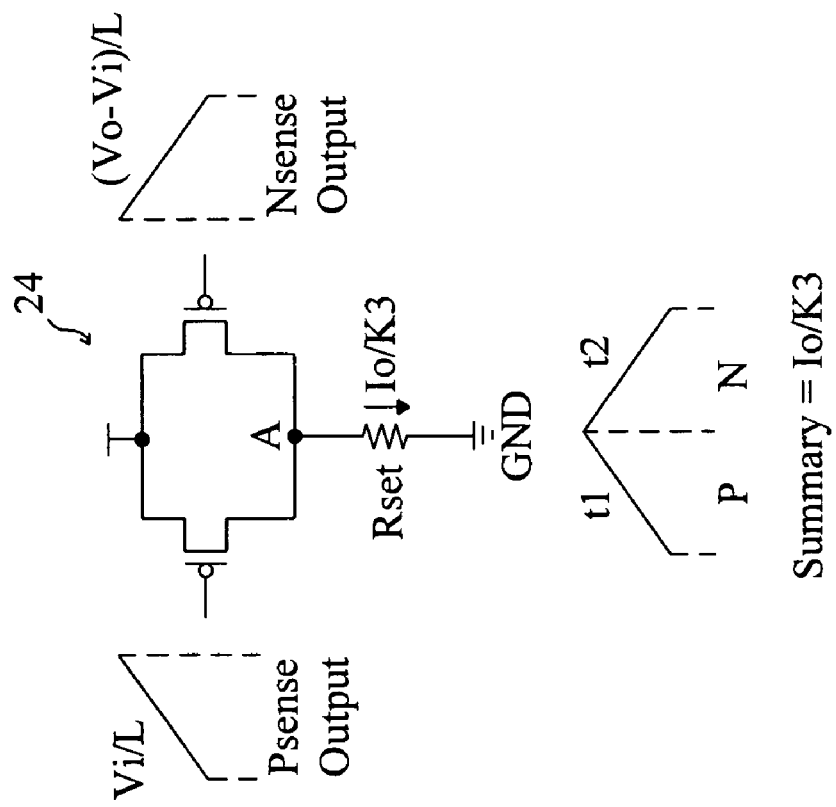
FIG. 3 is a schematic diagram of an embodiment for the summing circuit of FIG. 2.

FIG. 3 is a diagram of an embodiment for the summing circuit 24 shown in FIG. 2. The current I1 (Psense output) generated by the high-side sensing circuit 20 has a waveform with a slope of Vi/L, and the current I2 (Nsense output) generated by the low-side sensing circuit 22 has a waveform whose slope is (Vo-Vi)/L. The currents I1 and I2 are summarized by the summing circuit 24 into the current Io/K3, having the waveform shown at the lower part of FIG. 3. The current Io/K3 will flow through the setting resistor Rset to generate a voltage at the node A, whose variation is monitored by the error amplifier 34.

Figure 4:
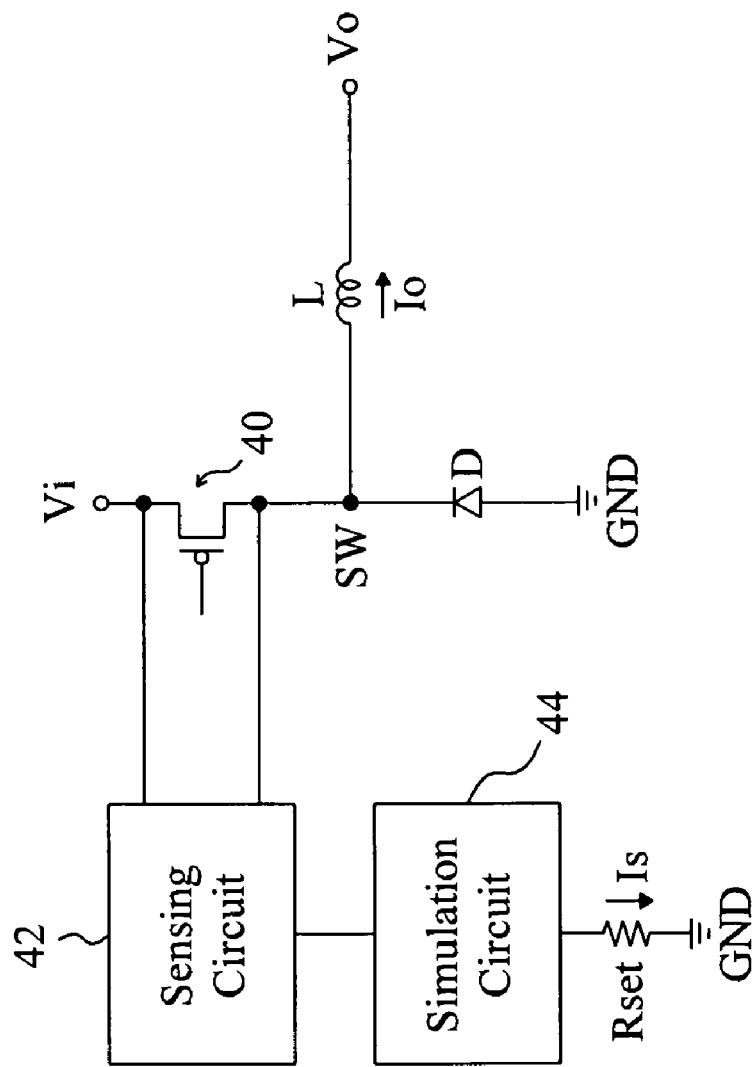
FIG. 4 is a schematic diagram of a second embodiment according to the present invention.

FIG. 4 provides a second embodiment according to the present invention, which uses an apparatus for output current detection of a non-synchronous buck voltage converter having a diode D as the low-side element. In this embodiment, instead of detecting the current in the diode D, the sensing circuit 42 only senses the current in the high-side transistor 40, and a current Is having the waveform shown at the lower part of FIG. 3 is produced by a simulation circuit 44 to provide to the setting resistor Rset to generate a voltage thereon for feedback control (not shown in FIG. 4). In another embodiment, the aforesaid current simulation is replaced by directly detecting the current in the diode D to be combined with the current in the high-side transistor 40 to supply to the setting resistor Rset.

Figure 5:
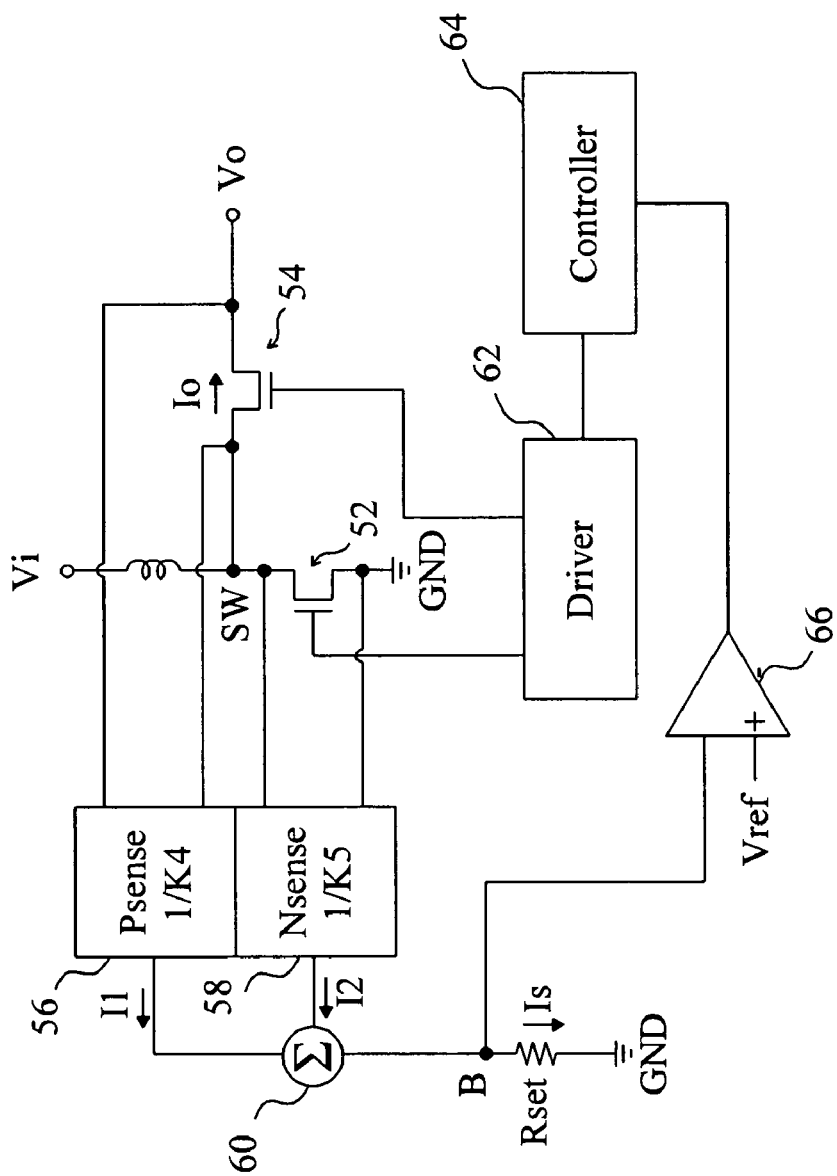
FIG. 5 is a schematic diagram of a third embodiment according to the present invention.

FIG. 5 is a diagram of a third embodiment according to the present invention for boost voltage regulators, in which a sensing circuit 56 senses the current in a high-side transistor 54 to generate a current I1, a sensing circuit 58 senses the current in a low-side transistor 52 to generate a current I2, and the currents I1 and I2 are summarized by a summing circuit 60 to generate a sensing current Is to flow through a setting resistor Rset to produce a voltage at a node B to be monitored by a comparator 66 to provide a feedback signal to a controller 64 for feedback control. A driver 62 generates driving signals to switch the high-side and low-side transistors 54, 52 under the control of the controller 64. In this embodiment, the proportion between the currents I1 and I2 is also adjustable, for example, by using different parameters K4 and K5.

Figure 6:
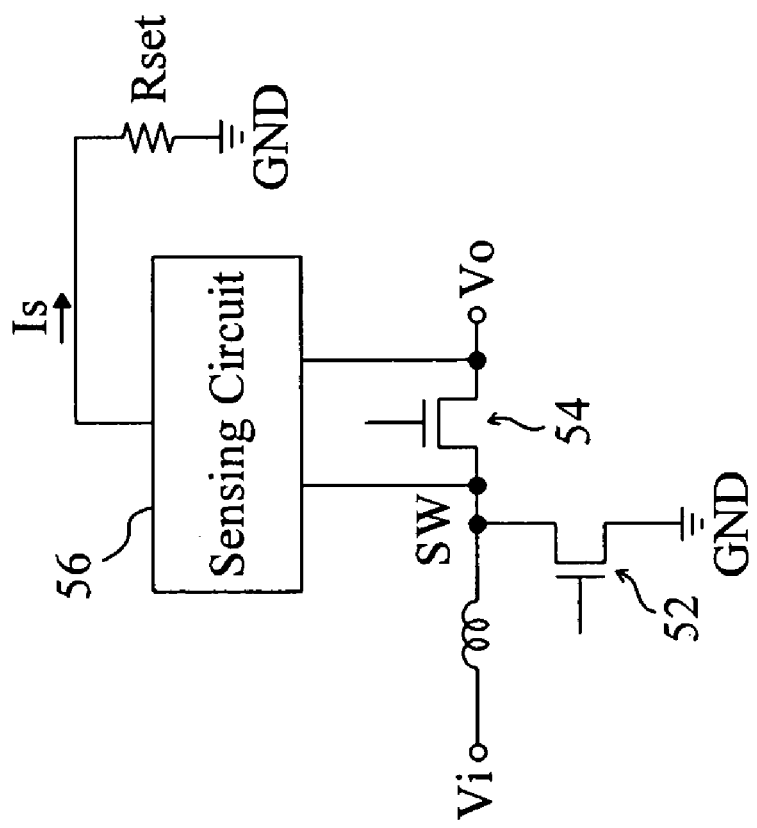
FIG. 6 is a schematic diagram of a modified embodiment from that of FIG. 5.

FIG. 6 is a diagram of a modified embodiment from that of FIG. 5. In this embodiment, the inverse of K5 is set to be zero. Namely, only the current in the high-side transistor 54 is sensed to generate a sensing current Is to flow through the setting resistor Rset to provide the variation of the output voltage Vo to be monitored.

In other embodiments, the apparatus and method according to the present invention are applied for output current detection of other types of voltage converters such as a boost-buck voltage regulator, an inverting voltage regulator, and so on.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for output current detection of a voltage regulator including a high-side element, a low-side element and an inductor, each having a terminal connected to a switching node, the apparatus comprising:

a high-side sensing circuit coupled to the high-side element, operative to detect the current in the high-side element to generate a first current;

a low-side sensing circuit coupled to the low-side element, operative to detect the current in the low-side element to generate a second current;

a summing circuit coupled to the high-side and low-side sensing circuits, operative to combine the first and second currents to generate a summed current; and a setting resistor coupled to the summing circuit, receiving the summed current to provide an output current variation information for feedback control of the voltage regulator.

2. The apparatus of claim 1, wherein the high-side sensing circuit and the low-side sensing circuit are a part of an overcurrent protection mechanism or a zero-current protection mechanism of the voltage regulator.

3. The apparatus of claim 1, wherein the setting resistor is coupled between the summing circuit and a ground terminal.

4. The apparatus of claim 1, wherein both the high-side element and the low-side element are transistors.

5. The apparatus of claim 1, wherein the high-side element is a transistor, and the low-side element is a diode.

6. The apparatus of claim 1, wherein the high-side element is coupled between a power input and the switching node, the low-side element is coupled between the switching node and a ground terminal, and the inductor is coupled between the switching node and a power output.

7. The apparatus of claim 1, wherein the high-side element is coupled between the switching node and a power output, the low-side element is coupled between the switching node and a ground terminal, and the inductor is coupled between a power input and the switching node.

8. The apparatus of claim 1, wherein the high-side element is coupled between a power input and the switching node, the low-side element is coupled between the switching node and a power output, and the inductor is coupled between the switching node and a ground terminal.

9. A method for output current detection of a voltage regulator including a high-side element, a low-side element and an inductor, each having a terminal connected to a switching node, the method comprising:

sensing the current in the high-side element to generate a first current;

sensing the current in the low-side element to generate a second current;

combining the first and second currents to generate a summed current; and providing the summed current to a setting resistor to generate a voltage to provide an output current variation information for feedback, control of the voltage regulator.

10. The method of claim 9, wherein both the high-side element and the low-side element are transistors.

11. The method of claim 9, wherein the high-side element is a transistor, and the low-side element is a diode.

12. The method of claim 9, wherein the high-side element is coupled between a power input and the switching node, the low-side element is coupled between the switching node and a ground terminal, and the inductor is coupled between the switching node and a power output.

13. The method of claim 9, wherein the high-side element is coupled between the switching node and a power output, the low-side element is coupled between the switching node and a ground terminal, and the inductor is coupled between a power input and the switching node.

14. The method of claim 9, wherein the high-side element is coupled between a power input and the switching node, the low-side element is coupled between the switching node and a power output, and the inductor is coupled between the switching node and a ground terminal.

15. A voltage regulator, comprising:
- a high-side element, a low-side element and an inductor, each having a terminal connected to a switching node;
- a high-side sensing circuit coupled to the high-side element, operative to detect the current in the high-side element to generate a first current;
- a low-side sensing circuit coupled to the low-side element, operative to detect the current in the low-side element to generate a second current;
- a summing circuit coupled to the high-side and low-side sensing circuits, operative to combine the first and second currents to generate a summed current;
- a setting resistor coupled to the summing circuit, receiving the summed current; and
- a controller for controlling at least one of the high-side element and the low-side element to generate an output voltage at a power output;
- wherein the voltage variation on the setting resistor is provided to the controller for feedback control.

16. The voltage regulator of claim 15, wherein the high-side sensing circuit and the low-side sensing circuit are a part of an over-current protection mechanism or a zero-current protection mechanism of the voltage regulator.

17. The voltage regulator of claim 15, wherein the setting resistor is coupled between the summing circuit and a ground terminal.

18. The voltage regulator of claim 15, wherein both the high-side element and the low-side element are transistors.

19. The voltage regulator of claim 15, wherein the high-side element is a transistor, and the low-side element is a diode.

20. The voltage regulator of claim 15, wherein the high-side element is coupled between a power input and the switching node, the low-side element is coupled between the switching node and a ground terminal, and the inductor is coupled between the switching node and a power output.

21. The voltage regulator of claim 15, wherein the high-side element is coupled between the switching node and a power output, the low-side element is coupled between the switching node and a ground terminal, and the inductor is coupled between a power input and the switching node.

22. The voltage regulator of claim 15, wherein the high-side element is coupled between a power input and the switching node, the low-side element is coupled between the switching node and a power output, and the inductor is coupled between the switching node and a ground terminal.

* * * * *